Figure 1:
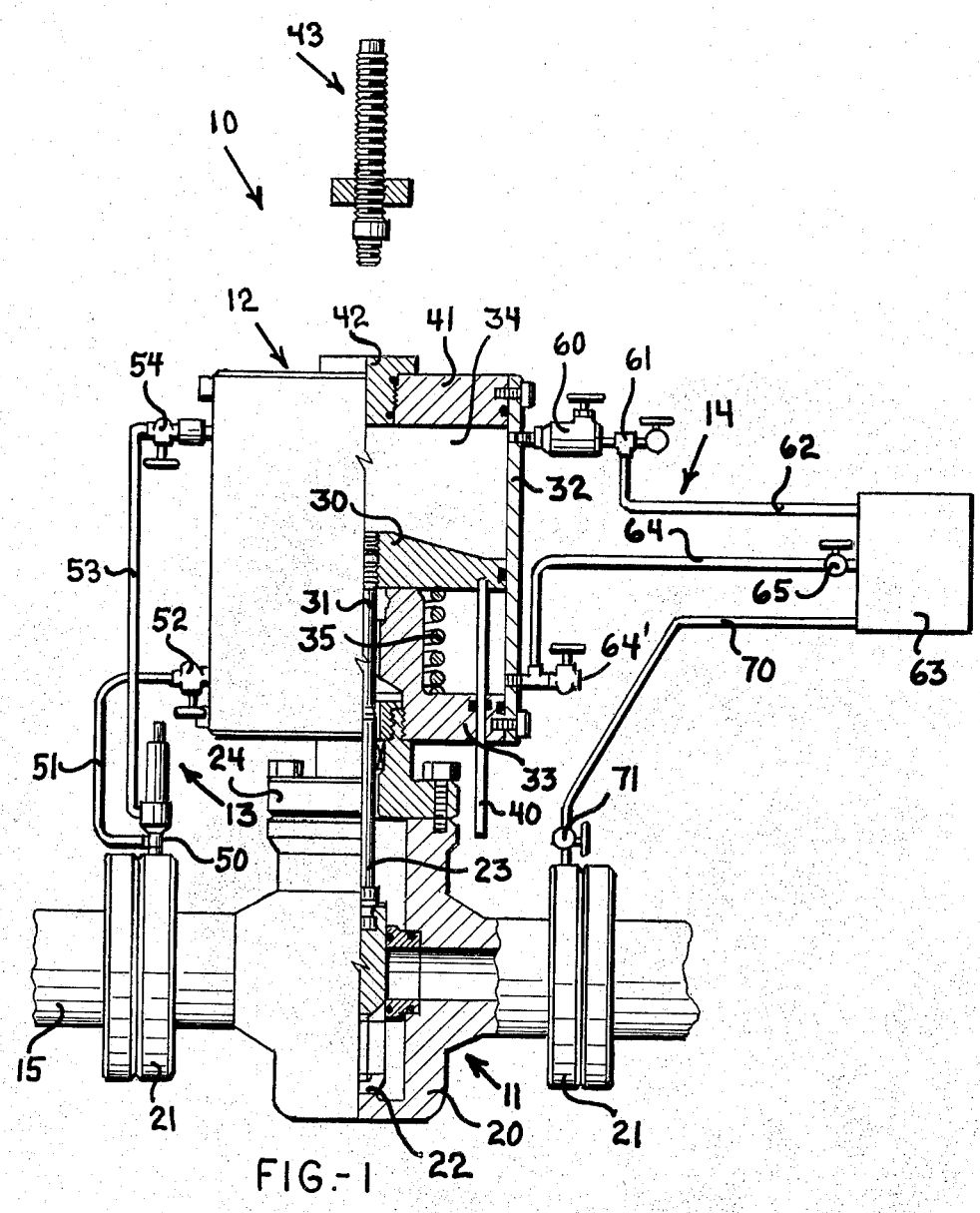

United States Patent [19]

Moore

[11] 4,240,463

[45] Dec. 23, 1980

[54] SAFETY VALVE ACTUATOR AND PILOT SYSTEM

[75] Inventor: Allen D. Moore, Marrero, La.

[73] Assignee: Otis Engineering Corporation, Dallas, Tex.

[21] Appl. No.: 61,497

[22] Filed: Jul. 27, 1979

[51] Int. Cl.³ ............................................. F16K 17/00
[52] U.S. Cl. ................................ 137/492.5; 137/488; 137/498
[58] Field of Search ...................... 137/492.5, 488, 458

[56] References Cited

U.S. PATENT DOCUMENTS

| | | | |
|---|---|---|---|
| 1,893,462 | 1/1933 | Wait | 137/488 |
| 1,918,891 | 7/1933 | Barrett | 137/492.5 X |
| 2,203,243 | 6/1940 | Wettstein | 137/492.5 X |
| 2,278,952 | 4/1942 | Soderberg | 137/492.5 |
| 2,637,946 | 5/1953 | Parks | 137/492.5 X |
| 2,707,483 | 5/1955 | Shafer | 137/488 X |
| 3,227,171 | 1/1966 | Woelfel | 137/488 X |
| 3,788,341 | 1/1974 | Athy | 137/488 X |
| 3,991,784 | 11/1976 | Gauo | 137/488 X |

*Primary Examiner*—Harold W. Weakley
*Attorney, Agent, or Firm*—H. Mathews Garland

[57] ABSTRACT

A safety valve actuator and pilot system for emergency closure of a flow line for fluids such as oil and gas including a hydraulic valve actuator connected on a valve in a flow line for opening and closing the valve, a pressure sensing pilot valve communicating with the flow line for directing operating fluid into the hydraulic actuator in response to a predetermined pressure change in the flow line, a closed fluid storage system connected with the hydraulic actuator for containing exhausted operating fluid and redirecting the fluid back into the flow line, and flow connections for operating the actuator to reopen the safety valve. One form of the system operates directly from flow line pressure for response to the predetermined high pressure. Another form of the system includes an operating fluid storage tank and functions in response to either a high or high and low pressure in the flow line.

14 Claims, 2 Drawing Figures

SAFETY VALVE ACTUATOR AND PILOT SYSTEM

This invention relates safety valves for fluid flow lines and more particularly relates to a hydraulic safety valve operator and pilot valve system for a flow line.

There have been numerous systems available for emergency closure of flow lines, particularly, lines used to conduct fluids such as petroleum oil and gas. These systems have generally been designed to function in response to either or both predetermined high and high and low pressures for shutting in the flow system in response to a variety of system malfunctions which may result in damage to personnel and property and loss of valuable fluids. Normally such systems include a hydraulic operating cylinder which is maintained under pressure during times when the control safety valve is open exhausting such pressure for closing the safety valve. Such a system is illustrated in U.S. Pat. No. 4,087,073 entitled Safety Valve With A Hydraulic Actuator issued to James E. Runberg and Karl N. Tunstall, May 2, 1978 and assigned to Otis Engineering Corporation. In such systems the requirement that the hydraulic actuator remain under pressure at all times during which the controlled safety valve is open increases the possibilities of malfunctions in comparison with a similar system which is only pressurized when safety valve closure is required. Additionally, some of the previous systems for operating safety valves require external pressure sources for valve closure and subsequent reopening.

It is a particularly important object of the invention to provide a new and improved hydraulic safety valve actuator and pilot valve system.

It is another object of the invention to provide a safety valve system of the character described which does not utilize pressure in the hydraulic actuator during normal operation of the system.

It is another object of the invention to provide a safety valve system which utilizes line pressure to operate the safety valve and thus does not require an external pressure source.

It is another object of the invention to provide a safety valve system which permits the safety valve to be reopened by use of line pressure.

It is another object of the invention to provide a safety valve operating system which contains exhausted operating fluid pressure and thus does not discharge it to the atmosphere and thus is a nonpolluting system.

It is another object of the invention to provide a safety valve operating system in which the exhausted operating fluid may be reintroduced into the flow line.

In accordance with the invention there is provided a safety valve operating and pilot valve system including a hydraulic valve actuator for opening and closing a safety valve in a flow line, means sensing the pressure in the flow line and directing an operating fluid pressure into the valve actuator in response to a predetermined pressure in the flow line, means for containing valve operating fluid exhausted from the actuator, and means for directing flow line pressure to the actuator to reopen the safety valve. In one form the system includes a high pressure responsive pilot valve which exhausts line pressure to the hydraulic safety valve actuator. In another form of the system of the invention an operating fluid storage tank charged by line pressure is connected with the valve actuator and operated by a pilot valve for closing the safety valve in response to a predetermined high or low pressure.

Figure 2:
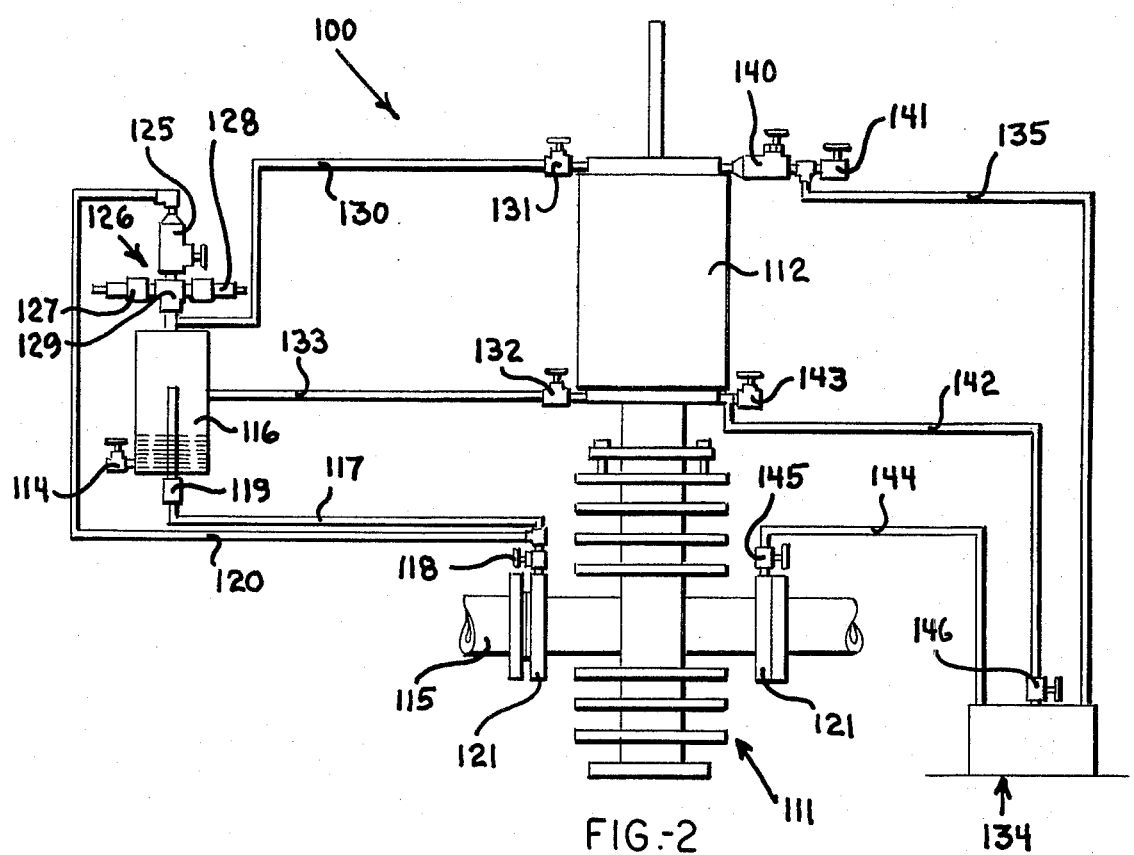

The foregoing objects and advantages of the present invention will be better understood from the following detailed description of preferred embodiments thereof taken in conjunction with the accompanying drawings wherein:

FIG. 1 is a side view in elevation and section of a form of the system of the invention which functions in response to a high line pressure; and FIG. 2 is a schematic side view in elevation of the system of the invention operating in response to a low line pressure or a high line pressure.

Referring to FIG. 1, a flow line safety valve system 10 including the features of the invention and operable in response to a high line pressure includes a safety valve 11 equipped with a hydraulic valve actuator 12, a high pressure responsive pilot valve 13 for directing line pressure to the actuator, and a closed flow system 14 for containing exhausted operating fluid and redirecting the fluid back into the flow line. The safety valve 11 is connected in a flow line 15 for shutting off flow in the line in response to a predetermined high pressure sensed by the pilot valve 13. In accordance with a particularly important feature of the invention, the pilot valve 13 directs operating line pressure into the actuator 12 only when safety valve closure is desired in response to the predetermined high pressure so that the valve actuator is not under fluid pressure during normal open operation of the safety valve.

The safety valve 11 is a gate type valve having a body 20 provided with end flanges 21 for connecting the valve into the flow line 15. The safety valve has a gate valve member 22 connected with a valve stem 23 which extends in sealed relationship through a flanged valve housing head 24. The valve stem 23 is connected with the hydraulic actuator 12 for raising and lowering the gate valve member 22 between a lower closed position as illustrated in FIG. 1 and an upper open position, not shown.

The hydraulic safety valve actuator 12 has an operating piston 30 connected on a piston rod 31 movable with a cylindrical pressure cylinder 32. The cylinder 32 is provided with a bottom closure plate 33 mounted on the safety valve housing head 24. The piston rod 31 is connected with the upper end of the valve stem 23. The piston 30 operates within a hydraulic operating fluid chamber 34 defined within the cylinder 32. The piston is biased upwardly by a spring 35 mounted around the piston rod 31 within the chamber 34 below the piston for biasing the piston upwardly toward a gate valve open position. An indicator rod 40 is supported at an upper end from the lower face of the piston 30 extending in sealed relationship downwardly through the base plate 33 for indicating the position of the piston 30 within the cylinder. The upper end of the cylinder 32 is closed by a head member 41 which includes a removable plug 42 allowing the insertion of an operating rod assembly 43 through the cylinder head for emergency manual operation of the valve actuator to open and close the safety valve. The lower end of the operating rod assembly 43 is engageable in the threaded bore through the piston 30 for raising and lowering the piston.

The pilot valve 13 is mounted on a pipe nipple 50 connected into the flange 21 communicating into the flow line 15 for conducting the flow line pressure to the pilot valve. A conduit 51 provided with a valve 52 is connected between the nipple 50 and the pressure chamber 34 through the side wall of the cylinder 32 beneath the piston 30 to conduct line pressure into the actuator 12 for reopening the safety valve. The exhaust of the pilot valve 13 is connected by a conduit 53 including a valve 54 into the cylinder 32 above the piston 30 for closing the safety valve in response to operation of the pilot valve. The pilot valve 13 is typically at Otis Engineering Corporation Type D high-pressure monitor-actuator pilot sold by Otis Engineering Corporation and illustrated at page 4033 of the 1974–75 "COMPOSITE CATALOG OF OIL FIELD EQUIPMENT AND SERVICES". The pilot valve 13 opens in response to a predetermined high pressure in the flow line 15 at the flange 21 exhausting the high line pressure through the conduit 53 into the hydraulic actuator 12 above the piston 30.

The fluid flow system 14 connected with the hydraulic actuator 12 includes a check valve 60 connected through a valve 61 to a conduit 62 leading to a pump 63. The check valve 60 communicates into the pressure chamber 34 above the piston 30. The pump 63 is also connected through a conduit 64 including a valve 65 to the pressure chamber 34 below the piston 30. A valve 64' is connected with the conduit 64 at the cylinder 32 for emergency discharge of fluids from the cylinder. The conduits 62 and 64 communicate with the suction side of the pump 63. The discharge side of the pump 63 is connected with the conduit 70 leading through a valve 71 into the safety valve flange 21 so that the pump 63 may discharge operating fluids back into the flow line 15. The check valve 60 may be an Otis Engineering Corporation Type M check valve illustrated and described at page 4034 of the 1974–75 "COMPOSITE CATALOG OF OIL FIELD EQUIPMENT AND SERVICES".

During normal operation of the valve system 10 the safety valve member 22 is open. When the safety valve is open the valve member 22 is at an upper end position as are the valve stem 23, the piston rod 31, and the piston 30 in the pressure chamber 34. The spring 35 beneath the piston 30 is expanded upwardly. The valve 52 is closed so that the flow line pressure is not communicated into the pressure chamber below the piston 30. The valve 54 is opened communicating the exhaust of the pilot valve 13 into the pressure chamber 34 above the piston 30. The check valve 60 is open allowing a slow seepage from the pressure chamber 34 into the conduit 62 to prevent unintentional closing of the safety valve in the the event of leakage through the pilot valve 13. The valve 61 is open so that the seepage through the valve 60 is admitted to the conduit 62. Also, the valve 65 in the conduit 64 is open allowing flow from the pressure chamber below the piston so that fluid pressure below the piston does not interfere with the intended closing of the safety valve when the control fluid pressure is admitted through the pilot valve 13. The valve 71 is closed so that there is no flow line pressure in the conduit 70. With the described settings of the various valves in the system, the safety valve will remain open until the pressure in the flow line exceeds the predetermined value at which the safety valve is set to be closed. When that predetermined pressure in the flow line at the pilot valve 13 is exceeded, the pilot valve opens communicating the flow line pressure through the conduit 53 and the valve 54 into the pressure chamber 34 above the piston 30. The sudden increase in pressure within the pressure chamber causes an increase in flow rate through the check valve 60 which, because of its velocity responsive characteristics, closes confining the increased flow line pressure within the chamber 34 forcing the piston 30 downwardly moving the gate valve member 22 downwardly to the closed position illustrated in FIG. 1. The pressure in the actuator 12 within the chamber 34 above the piston 30 remains in the chamber until manually released holding the safety valve down in the closed position.

The safety valve may be returned to normal operation, that is, reopened, by relieving the operating fluid pressure in the chamber 34 and raising the piston 30 and gate valve member back upwardly to reopen the valve. The pressure is relieved in the chamber 34 by reopening the velocity check valve 60 by equalizing the pressures on opposite sides of the ball check member in the valve. The valve 54 is closed to isolate the conduit 53 and the pilot valve 13 from the pressure chamber. The valve 65 is closed and the valve 52 is opened admitting upstream flow line pressure into the chamber 34 below the piston 30 to raise the piston reopening the safety valve. The exhausting operating fluid in the chamber 34 above the piston is displaced from the chamber as the piston is raised through the open velocity check valve 60 and the conduit 62 to the reservoir pump system 63. When the safety valve is fully reopened the various valves are restored to the normal operating positions thereby resetting the valve system so that another pressure surge above the predetermined value at which the pilot valve 13 is set will again close the safety valve. The exhausted operating fluid pressure which had been used in the chamber 34 to close the safety valve is discharged back into the flow line from the pump reservoir system 63 through the conduit 70 by operating the pump and opening the valve 71.

It may be possible to reopen the safety valve without the admission of flow line pressure through the conduit 51. Under such circumstances the valve 54 is closed while the velocity check valve 60 is reopened to allow exhaust of the operating fluid pressure from the chamber 34 so that the spring 35 forces the piston 30 upwardly reopening the safety valve. Under these circumstances, of course, the reservoir pump system 63 is also used to return the exhausted operating fluid back into the system through the conduit 70.

FIG. 2 illustrates another form 100 of the system of the invention which is operable responsive to both a low flow line pressure and a high flow line pressure for closing the safety valve in the event of damage or malfunction in the system causing the flow line pressure to either drop below a predetermined value or rise above a predetermined value. The system 100 includes a safety valve 111 which is opened and closed by a hydraulic actuator 112. The safety valve 111 and the actuator 112 may be identical in construction to the valve 11 and the actuator 12 of the previously described system 10. The valve 111 includes housing flanges 121 connecting the valve housing into the flow line 115. A valve operating fluid reservoir 116 is provided for storage of operating fluid used to operate the actuator 112. The reservoir 116 is connected by a conduit 117 to a valve 118 connected on the flange 121 into the flow line 115 for supplying flow line pressure into the reservoir 116. A discharge valve 114 is connected into the lower portion of the reservoir 116 for emptying the reservoir if necessary. A check valve 119 is included in the conduit 117 to prevent back flow from the reservoir 116 into the flow line if the pressure in the flow line drops below that of the reservoir. A conduit 120 is connected through the valve 118 into the flow line 115 and leads to a velocity check valve 125 connected with a low pressure responsive monitor-actuator pilot valve 127, a high pressure responsive monitor-actuator pilot valve 128, and an actuator pilot valve 129. The velocity check valve 125 is identical in construction to the previously described velocity check valve 60. The actuator pilot valve 129 may be an Otis Engineering Corporation Type M actuator pilot illustrated at page 4034 on the 1974-75 "COMPOSITE CATALOG OF OIL FIELD EQUIPMENT AND SERVICES" which illustration also shows the assembly of the pilot valve 129 with the pilot valves 127 and 128. The pilot valves 127 and 128 are, respectively, Otis Engineering Corporation Type B and Type D monitor-actuator pilots shown at page 4033 of the 1974-75 "COMPOSITE CATALOG OF OIL FIELD EQUIPMENT AND SERVICES". The pilot valve 129 is mounted on the reservoir 116 communicating at the lower end thereof with the reservoir and at the upper end with the control line pressure from the conduit 120 which is controlled by the pilot valves 127 and 128. The exhaust of the pilot valve 129 communicates with the conduit 130 which extends through a valve 131 to the pressure chamber of the safety valve actuator 112. The lower end of the pressure chamber of the actuator 112 is connected through a valve 132 and a conduit 133 with the reservoir 116. A reservoir and pump system 134 for handling exhausting operating fluid from the actuator 112 is connected with a conduit 135 leading through a velocity check valve 140 to the pressure chamber of the actuator 112 and provided with a valve 141. The reservoir pump system 134 is also connected with the pressure chamber of the actuator 112 by a conduit 142 which leads to the lower end of the pressure chamber of the actuator 112. A valve 143 connects into the conduit 142 to permit discharge or dumping of fluids from the actuator pressure chamber. The conduits 135 and 142 are connected with the suction side of the pump in the system 134. The discharge side of the pump in the system 134 is connected with a conduit 144 leading through a valve 145 to the flange 121 on the downstream side of the safety valve 111.

In normal operation the safety valve 111 is open and the reservoir 116 is charged with fluid under pressure for operating the actuator 112 to close the safety valve responsive to either a low pressure or a high pressure in the flow line 115. The reservoir 116 is charged with flow line pressure by opening the valve 118 with the valve 132 closed so that fluid from the flow line passes through the conduit 117 and the check valve 119 into the reservoir 116. The check valve 119 prevents back flow of the operating fluid from the reservoir 116 into the conduit 117. The valve 132 remains closed, the valve 118 remains open, and the valve 131 in the conduit 130 remains open leading into the upper end of the pressure chamber of the actuator 112. The pilot valve 129 is closed confining the operating fluid pressure within the chamber 116. The check valve 125 is open communicating the flow line pressure in the conduit 120 to both the low pressure responsive monitor-actuator pilot 127 and the high pressure responsive monitor-actuator pilot 128. The check valve 140 and the valve 146 in the conduit 142 are both open leading to the reservoir in the system 134.

If a low pressure below a predetermined value for which the pilot valve 127 is set occurs in the flow line 115, the low pressure communicates through the conduit 120, the velocity check valve 125, and the upper end of the pilot valve 129 into the pilot valve 127 which responds to the low pressure by exhausting pressure from the body of the pilot valve 127 causing the velocity check valve 125 to close and operating the actuator pilot 129. The actuator pilot 129 opens exhausting the fluid pressure in the reservoir 116 into the conduit 130 through which the fluid pressure acts into the actuator 112. The increase in pressure in the actuator 112 causes the velocity check valve 140 to close so that the pressure builds up in the actuator 112 closing the safety valve.

In the event that the pressure in the flow line 115 rises to a level which exceeds the predetermined value at which the high pressure pilot valve 128 is set to operate, the valve 128 operates exhausting pressure causing the velocity check valve 125 to close and operating the actuator pilot 129 exhausting the fluid pressure in the reservoir 116 through the conduit 130 to the actuator 112 thereby closing the safety valve in the same manner as described when a low pressure occurs in the flow line.

In the instance of closure of the safety valve in response to either the low or the high pressure, the closure of the velocity check valve 125 prevents bleeding of the conduit 120 leading to the flow line 115 only to the extent necessary to reduce the pressure sufficiently to operate the actuator pilot 129. This involves only a minute volume of operator fluid between the velocity check valve 125 and the body of the actuator pilot 129.

The safety valve 111 may be restored to service by closing the valve 131 and reopening the velocity check valve 140 allowing the pressure operating fluid in the actuator 112 to exhaust to the reservoir of the system 134. If more force than the spring beneath the piston of the actuator 112 is required to reopen the safety valve, the valve 132 in the conduit 134 may be opened to allow flow from the flow line 115 through the conduit 117, the reservoir 116 and the conduit 133 to enter the actuator 112 below the operating piston. To confine the reopening operating fluid pressure below the piston it will be necessary to close the valves 143 and 146. After reopening the safety valve using flow line pressure the valve 132 is reclosed leaving the reservoir 116 charged with flow line pressure for subsequent use in again reclosing the safety valve. The valve 146 is then reopened so that fluid in the actuator below the operating piston may exhaust into the reservoir of the system 134. The complete return of the system to operating condition also requires that the valve 131 be reopened, the velocity check valve 125 be reopened, and the pilot valves 127 and 128 be reset so that when they again respond to either a low or high pressure the valves will operate the actuator pilot 129 to again exhaust the operating fluid pressure in the reservoir 116 into the actuator 112.

The operating fluids exhausted from the actuator 112 into the system 134 both after the closure of the safety valve and after reopening the safety valve may be returned to the flow line by the pump in the system 134 through the conduit 144 and the open valve 145. The valve 145 is then reclosed.

It will be recognized that in the system 100 the use of the check valve 119 prevents the back flow of the operating fluid pressure in the reservoir 116 so that when a low pressure occurs in the flow line the reservoir pressure is available for closing the safety valve.

It will be recognized from the foregoing description and the drawings that a new and improved form of safety valve operating system for a flow line has been provided which includes means for closing the safety valve without maintaining a fluid pressure in the pressure chamber of the safety valve actuator. It will be recognized that the system uses flow line pressure to actuate the valve in both the high pressure only and the high and low pressure responsive forms of the system. In the form of the system including low pressure response a separate reservoir charged by the flow line is employed to store the operating fluid pressure. Further, flow line pressure is available for reopening the safety valve where needed. Additionally, a system is provided for containing and reintroducing into the flow line the operating fluid used to close and reopen the safety valve. The use of a velocity check valve on the pressure chamber of the safety valve actuator prevents a slow buildup of pressure in the operating chamber of the actuator which might cause the safety valve to close at a time other than in response to the predetermined pressure at which it is set to close. Additionally, the use of the velocity check valve in the high and low pressure responsive form of the system prevents the pilot valves from continuously bleeding the sensing line leading to the flow line. Still further, both forms of the system are essentially pollution free as the operating fluid used to close and open the safety valve is reintroduced into the system with the only loss to the atmosphere being a small minute quantity between the velocity check valve and the pilot valves in the combined high-low pressure form of the system.

In the event that containing the spent operating fluid after closing and reopening the safety valve is not required or when pollution is not a principal consideration, both forms of the system shown in FIGS. 1 and 2 may be modified within the scope of the invention. In the system 10 of FIG. 1, the pump-reservoir system 14 may be eliminated by removing the conduits 62, 64, and 70, and the pump and reservoir 63, leaving the valves 60 and 64' for venting the cylinder chamber 34 to atmosphere above and below the piston 30. The system 100 may be similarly modified by eliminating the conduits 135, 142, and 144, and the pump and reservoir 134, leaving the valves 140 and 143 to vent the pressure chamber of the actuator 112 to atmosphere when closing and reopening the safety valve 111.

What is claimed is:

1. A safety valve actuator and pilot valve system for closing and reopening a normally open gate valve in a flow line responsive to a predetermined pressure value in said flow line comprising: a hydraulic valve actuator coupled with said safety valve for closing said safety valve responsive to a fluid pressure increase communicated to said actuator from said flow line; pressure responsive pilot valve means connected with said flow line; a conduit from said pilot valve means to said valve actuator for conducting operating fluid pressure to said actuator when said pilot valve functions to close said safety valve; a conduit from said flow line to said valve actuator for conducting pressure fluid from said flow line to reopen said safety valve; and a conduit from said valve actuator to said flow line to return operating fluid from said actuator to said flow line after said operating fluid has been used to close said safety valve.

2. The safety valve actuator and pilot valve system of claim 1 wherein said pilot valve means is operable responsive to a predetermined high pressure value in said flow line.

3. A safety valve actuator and pilot valve system in accordance with claim 1 wherein said pilot valve means is operable responsive to either of a predetermined high pressure value in said flow line and a predetermined low pressure value in said flow line, including an operating fluid reservoir, a conduit from said pilot valve means to said reservoir for flowing operating fluid from said reservoir through said pilot valve means to said actuator, and a conduit from said flow line to said reservoir for charging said reservoir with operating fluid from said flow line.

4. A safety valve actuator and pilot valve system in accordance with claim 3 including a fluid velocity responsive check valve between said pilot valve means and said flow line, and a fluid velocity responsive check valve between said actuator and said flow line in said conduit for returning operating fluid from said actuator back to said flow line.

5. A safety valve actuator and pilot valve system in accordance with claim 4 wherein said pilot valve means includes a first low-pressure responsive monitor-actuator pilot valve, a second high-pressure responsive monitor-actuator pilot valve, and a third actuator pilot valve connected with said first and second pilot valves and operable responsive to either of said first and second pilot valves to release operating fluid pressure from said reservoir to said safety valve actuator.

6. A safety valve actuator and pilot valve system for closing and reopening a normally open gate valve in a flow line responsive to a predetermined pressure value in said flow line comprising: a hydraulic valve actuator for connection on said safety valve including a piston rod and piston in a cylinder, said cylinder being connectible on the housing of said gate valve and said piston rod being connectible with the valve stem of said gate valve, spring means in said cylinder engaged with a first side of said piston biasing said piston in a first valve opening direction, said piston and said piston rod being movable in a second opposite valve closing direction responsive to operating fluid injected into said cylinder on the second opposite side of said piston; a high pressure responsive pilot valve connected into said flow line; a conduit connected from said pilot valve into said cylinder on said second side of said piston for conducting operating fluid from said flow line to said cylinder responsive to operation of said pilot valve at a predetermined high pressure value in said flow line; a valve in said conduit from said pilot valve to said cylinder for shutting off flow in said conduit; a conduit including a valve from said flow line into said cylinder on said first side of said piston for introducing operating fluid from said flow line into said cylinder for opening said gate valve; a pump and fluid reservoir system for receiving operating fluid from said cylinder and returning said fluid to said flow line; a conduit including a velocity check valve from said cylinder on said second side of said piston to said pump and fluid reservoir system; a conduit from said cylinder on said first side of said piston to said pump and fluid reservoir system; and a conduit from said pump and fluid reservoir system to said flow line for reintroducing operating fluid into said flow line from said cylinder on both said first and second side of said piston.

7. A safety valve actuator and pilot valve system for closing and reopening a normally open gate valve in a flow line responsive to either of a predetermined high pressure value and a predetermined low pressure value in said flow line comprising: a hydraulic valve actuator for opening and closing said gate valve including a cylinder having means for mounting on the housing of said gate valve defining a fluid pressure tight chamber, a piston movable in said cylinder, a piston rod connected with said piston and having means for connection with the valve stem of said gate valve for opening and closing said gate valve responsive to operating fluid pressure on said piston, and a spring in said cylinder engaged between one end of said cylinder and one side of said piston biasing said piston and said piston rod in a valve opening direction; an operating fluid storage reservoir; a conduit including a velocity check valve connected with said reservoir and connectible into said flow line for supplying said reservoir with operating fluid from said flow line; an actuator pilot valve connected into said reservoir; a conduit including a cut-off valve from said actuator pilot to said cylinder on a second side of said piston for supplying operating fluid from said reservoir into said cylinder against said second side of said piston for closing said gate valve responsive to operation of said actuator pilot conduit from said flow line to said actuator pilot; a low-pressure monitor-actuator pilot valve connected into said actuator pilot valve between said actuator pilot valve and said velocity check valve; a high-pressure monitor-actuator pilot valve connected into said actuator pilot valve between said actuator pilot valve and said velocity check valve; a conduit including a cut-off valve from said operating fluid storage reservoir into said gate valve actuator cylinder on said first side of said piston for supplying operating fluid from said storage reservoir to reopen said gate valve; a pump and operating fluid storage system for receiving and reintroducing into said flow line operating fluid employed in said gate valve actuator for closing and reopening said gate valve; a conduit including a velocity check valve from said gate valve actuator cylinder on said second side of said piston to said operating fluid storage and pump system; a conduit from said gate valve actuator cylinder on said first side of said piston including a cut-off valve to said operating fluid pump and storage system; and a conduit from said operating fluid pump and storage system including a cut-off valve connectible into said flow line for reintroducing into said flow line operating fluid employed in closing and reopening said gate valve in said gate valve actuator.

8. A safety valve actuator and pilot valve system for closing and reopening a normally open gate valve in a flow line responsive to a predetermined pressure value in said flow line comprising: a hydraulic valve actuator coupled with said safety valve for closing said safety valve responsive to a fluid pressure increase communicated to said actuator from said flow line; pressure responsive pilot valve means connected with said flow line; a conduit from said pilot valve means to said valve actuator for conducting operating fluid pressure to said actuator when said pilot valve functions to close said safety valve; a conduit from said flow line to said valve actuator for conducting pressure fluid from said flow line to reopen said safety valve; and valve means from said valve actuator to vent spent operating fluid after said operating fluid has been used to close said safety valve.

9. The safety valve actuator and pilot valve system of claim 8 wherein said pilot valve means is operable responsive to a predetermined high pressure value in said flow line.

10. A safety valve actuator and pilot valve system in accordance with claim 8 wherein said pilot valve means is operable responsive to either of a predetermined high pressure value in said flow line and a predetermined low pressure value in said flow line, including an operating fluid reservoir, a conduit from said pilot valve means to said reservoir for flowing operating fluid from said reservoir through said pilot valve means to said actuator, and a conduit from said flow line to said reservoir for charging said reservoir with operating fluid from said flow line.

11. A safety valve actuator and pilot valve system in accordance with claim 10 including a fluid velocity responsive check valve between said pilot valve means and said flow line, and said valve means from said valve actuator includes a velocity check valve.

12. A safety valve actuator and pilot valve system in accordance with claim 11 wherein said pilot valve means includes a first low-pressure responsive monitor-actuator pilot valve, a second high-pressure responsive monitor-actuator pilot valve, and a third actuator pilot valve connected with said first and second pilot valves and operable responsive to either of said first and second pilot valves to release operating fluid pressure from said reservoir to said safety valve actuator.

13. A safety valve actuator and pilot valve system for closing and reopening a normally open gate valve in a flow line responsive to a predetermined pressure value in said flow line comprising: a hydraulic valve actuator for connection on said safety valve including a piston rod and piston in a cylinder, said cylinder being connectible on the housing of said gate valve and said piston rod being connectible with the valve stem of said gate valve, spring means in said cylinder engaged with a first side of said piston biasing said piston in a first valve opening direction, said piston and said piston rod being movable in a second opposite valve closing direction responsive to operating fluid injected into said cylinder on the second opposite side of said piston; a high pressure responsive pilot valve connected into said flow line; a conduit connected from said pilot valve into said cylinder on said second side of said piston for conducting operating fluid from said flow line to said cylinder responsive to operation of said pilot valve at a predetermined high pressure value in said flow line; a valve in said conduit from said pilot valve to said cylinder for shutting off flow in said conduit; a conduit including a valve from said flow line into said cylinder on said first side of said piston for introducing operating fluid from said flow line into said cylinder for opening said gate valve; and vent lines from said cylinder on each side of said piston including a velocity check valve from said vent line on said second side of said piston and a shut-off valve in said vent line on said first side of said piston.

14. A safety valve actuator and pilot valve system for closing and reopening a normally open gate valve in a flow line responsive to either of a predetermined high pressure value and a predetermined low pressure value in said flow line comprising: a hydraulic valve actuator for opening and closing said gate valve including a cylinder having means for mounting on the housing of said gate valve defining a fluid pressure tight chamber, a piston movable in said cylinder, a piston rod connected with said piston and having means for connection with the valve stem of said gate valve for opening and closing said gate valve responsive to operating fluid pressure on said piston, and a spring in said cylinder engaged between one end of said cylinder and one side of said piston biasing said piston and said piston rod in a valve opening direction; an operating fluid storage reservoir; a conduit including a velocity check valve connected with said reservoir and connectible into said flow line for supplying said reservoir with operating fluid from said flow line; an actuator pilot valve connected into said reservoir; a conduit including a cut-off valve from said actuator pilot to said cylinder on a second side of said piston for supplying operating fluid from said reservoir into said cylinder against said second side of said piston for closing said gate valve responsive to operation of said actuator pilot conduit from said flow line to said actuator pilot; a low-pressure monitor actuator pilot valve connected into said actuator pilot valve between said actuator pilot valve and said velocity check valve; a high-pressure monitor-actuator pilot valve connected into said actuator pilot valve between said actuator pilot valve and said velocity check valve; a conduit including a cut-off valve from said operating fluid storage reservoir into said gate valve actuator cylinder on said first side of said piston for supplying operating fluid from said storage reservoir to reopen said gate valve; a vent line including a velocity check valve from said gate valve actuator cylinder on said second side of said piston and a vent line from said gate valve actuator cylinder on said first side of said piston including a cut-off valve.

* * * * *